J. J. Craig,

Fly Trap.

No. 94,569. Patented Sep. 7, 1869.

Witnesses. Inventor

United States Patent Office.

J. J. CRAIG, OF KNOXVILLE, TENNESSEE.

Letters Patent No. 94,569, dated September 7, 1869.

IMPROVED FLY-TRAP.

The Schedule referred to in these Letters Patent and making part of the same.

*To all whom it may concern:*

Be it known that I, J. J. CRAIG, of Knoxville, in the county of Knox, and in the State of Tennessee, have invented a new and useful Improvement in Fly-Traps; and do hereby declare that the following is a full, clear, and exact description thereof, reference being had to the accompanying drawings, and to the letters of reference marked thereon, of which drawings—

Like letters denote like parts in each figure.

Figure 1:
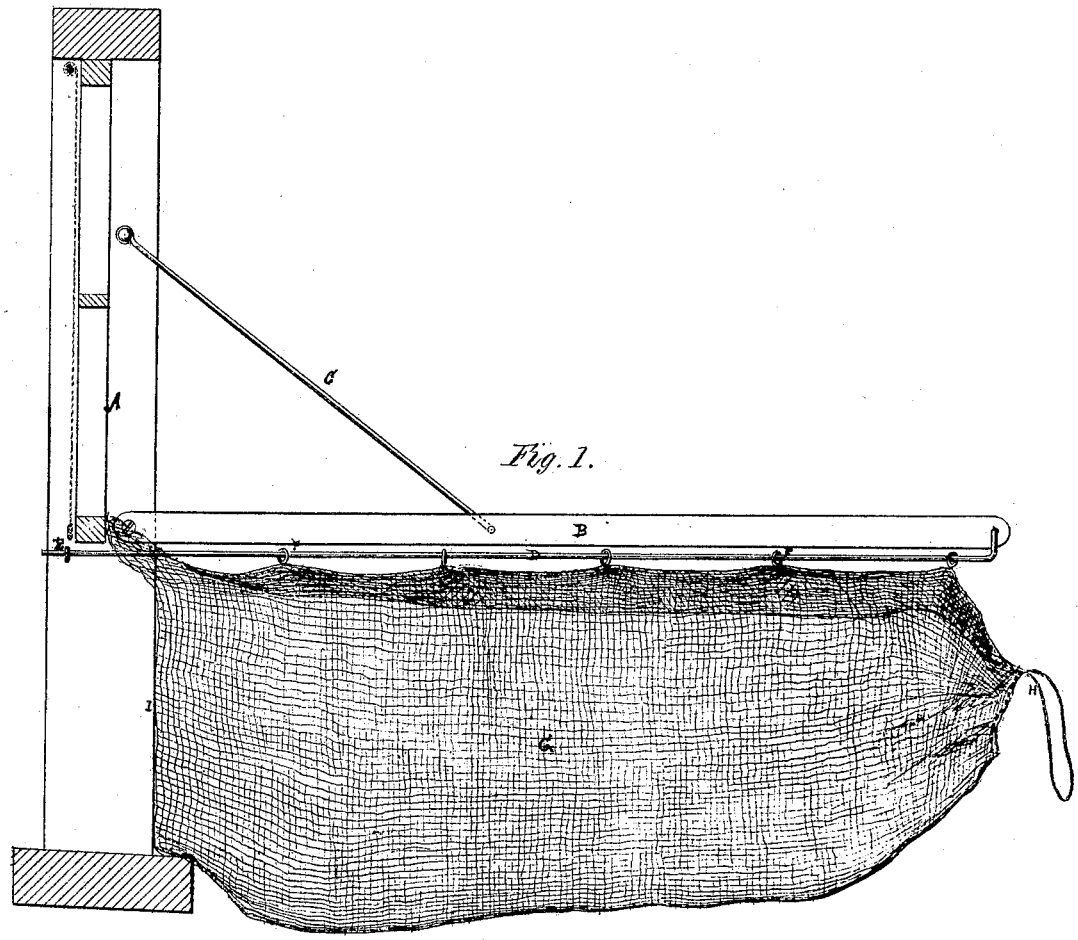
Figure 1 is a vertical sectional side view of my invention in position.
Figure 2:
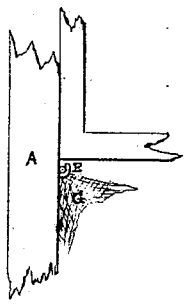
Figure 2 is a broken section of the same, showing the method of attachment of the net to a window-frame.

The object of my invention is the production of a trap for house-flies, which may be cheap, simple, and durable in construction, easily adjusted, capable of being used in any dwelling, and in any window, and very effective in operation.

The nature of my invention is such a contrivance; and consists in the construction and arrangement of the several parts, of which—

A represents a window with the lower sash raised.

B are two wooden rods, about six feet long, of suitable width and depth, projecting horizontally outward, the inner ends of which are secured to the inner sides of the window-frame, at the top of the opening made by raising the sash.

These rods are secured in position by metallic rods C, which are attached, at one end, to the inner sides of the window-frame near its top, and at the other to the rods B, at one-third or half the distance from the window to the end of said rods.

Secured to the outer end of each of the rods B, and dropping a little below, and parallel with it, is a metallic rod, D, whose inner end rests in hooks E, on the inner sides of the window-frame.

Traversing upon these rods D are suitable rings F, to which are attached the upper sides of a bag, G, made of gauze or mosquito-netting.

The ends of this bag are open, but the outer end H is provided with a suitable string, passing around the circumference of the same, by which it may be drawn closely, and made tight.

The inner end I of the bag is left open, and is fastened, by its edges, to suitable hooks, upon the sides of the window-frame, upon its sill and upon the bottom of the lower window-sash, in such a way that all flies passing out of the open window must go into said bag.

To operate this fly-trap, I fasten the frame in position, with the bag extended, its outer end drawn close, and its inner end fastened to the hooks, close the doors of the room, darken all the windows, including the upper part of that where the trap is, by proper curtains, dark cloth, or any convenient means, and then commence driving the flies with a duster, napkin, or other convenient means. The flies, when disturbed, will immediately seek to escape from the room through the net, and all of them will soon get into it. I then unhook the inner end of the bag, close and grasp it in the hand, remove the inner ends of the rods D from their hooks, and draw the bag off from them. The flies will be found all gathered into the outer end of the bag. I dip the bag, or the end containing the flies, into water, which is better, for the purpose of killing them instantly, if hot, and then open the end H of the bag, and empty the dead flies out.

Having tried this fly trap for several weeks, I know that it is effective and easily managed.

What I claim as my invention, and desire to secure by Letters Patent, is—

The fly-trap above described, composed of the rods B and D, the brace C, the rings F, and the bag G, in connection with a partially-opened window, when constructed, arranged, and operating as and for the purpose aforesaid.

In testimony that I claim the foregoing, I have hereunto set my hand, this 9th day of August, 1869.

J. J. CRAIG.

Witnesses:
F. W. KUHLMAN,
I. E. BARRY, Jr.